US010362526B2

(12) United States Patent
Gokturk et al.

(10) Patent No.: US 10,362,526 B2
(45) Date of Patent: Jul. 23, 2019

(54) CLIENT STEERING

(71) Applicant: AirTies Kablosuz Iletism Sanayi Ve Disticaret AS, Istanbul (TR)

(72) Inventors: Sarper M. Gokturk, Istanbul (TR); Alper Akcan, Istanbul (TR); Metin Ismail Taskin, Istanbul (TR)

(73) Assignee: Airties Kablosuz Iletism Sanayi Ve Disticaret AS, Istanbul (TR)

( * ) Notice: Subject to any disclaimer, the term of this patent is extended or adjusted under 35 U.S.C. 154(b) by 0 days.

(21) Appl. No.: 15/534,772

(22) PCT Filed: Dec. 14, 2015

(86) PCT No.: PCT/EP2015/079673
§ 371 (c)(1),
(2) Date: Jun. 9, 2017

(87) PCT Pub. No.: WO2016/092121
PCT Pub. Date: Jun. 16, 2016

(65) Prior Publication Data
US 2017/0374602 A1    Dec. 28, 2017

Related U.S. Application Data

(63) Continuation-in-part of application No. PCT/EP2015/064163, filed on Jun. 23, 2015, and a (Continued)

(30) Foreign Application Priority Data

Dec. 12, 2014  (GB) .................................. 1422183.2

(51) Int. Cl.
*H04W 40/36* (2009.01)
*H04W 48/18* (2009.01)
(Continued)

(52) U.S. Cl.
CPC ............. *H04W 40/36* (2013.01); *H04L 43/12* (2013.01); *H04L 45/125* (2013.01);
(Continued)

(58) Field of Classification Search
CPC ..... H04W 40/36; H04W 24/10; H04W 40/12; H04W 48/18; H04W 48/20; H04L 43/12; H04L 45/125
See application file for complete search history.

(56) References Cited

U.S. PATENT DOCUMENTS

2006/0268711 A1*  11/2006  Doradla .............. H04L 12/5692
                                                                    370/235
2007/0072600 A1    3/2007  Cho et al.
(Continued)

FOREIGN PATENT DOCUMENTS

EP    1503544 A2    2/2005
EP    1734705 A2    12/2006
(Continued)

OTHER PUBLICATIONS

U.S. Appl. No. 61/943,071, filed Feb. 21, 2014 (Year: 2014).*
(Continued)

*Primary Examiner* — Brandon M Renner
*Assistant Examiner* — Jay L Vogel
(74) *Attorney, Agent, or Firm* — Harness, Dickey & Pierce, P.L.C.

(57) ABSTRACT

A wireless network device, for use within a wireless network, comprising: a processor; a memory; and an interface for receiving and transmitting data; wherein the wireless network device is adapted to: determine a first cost associated with communication between the wireless network device and a client device to which the wireless network device is connectable; determine a second cost associated with communication between the client device and a further
(Continued)

wireless network device to which the client device is connectable; determine whether the first cost or the second cost is the lower cost; and if the second cost is the lower cost, the wireless network device is adapted to guide the client device to communicate with the further network device.

18 Claims, 7 Drawing Sheets

Related U.S. Application Data continuation-in-part of application No. 14/747,438, filed on Jun. 23, 2015, now Pat. No. 10,206,166.

(60) Provisional application No. 62/015,853, filed on Jun. 23, 2014.

(51) Int. Cl.

| | |
|---|---|
| *H04W 48/20* | (2009.01) |
| *H04L 12/729* | (2013.01) |
| *H04W 24/10* | (2009.01) |
| *H04L 12/26* | (2006.01) |
| *H04W 40/12* | (2009.01) |
| *H04W 88/08* | (2009.01) |

(52) U.S. Cl.
CPC ........... *H04W 24/10* (2013.01); *H04W 40/12* (2013.01); *H04W 48/18* (2013.01); *H04W 48/20* (2013.01); *H04W 88/08* (2013.01)

(56) References Cited

U.S. PATENT DOCUMENTS

| | | | |
|---|---|---|---|
| 2008/0013459 A1 | 1/2008 | Do et al. | |
| 2008/0108369 A1 | 5/2008 | Visotsky et al. | |
| 2009/0088152 A1* | 4/2009 | Orlassino | H04W 48/08 455/432.1 |
| 2009/0129272 A1 | 5/2009 | Padfield et al. | |
| 2010/0046417 A1 | 2/2010 | Tamura | |
| 2010/0189012 A1 | 7/2010 | Shibuya et al. | |
| 2011/0258236 A1* | 10/2011 | Iyer | H04W 12/06 707/802 |
| 2013/0077505 A1 | 3/2013 | Choudhary et al. | |
| 2013/0188542 A1 | 7/2013 | Merlin et al. | |
| 2013/0336213 A1* | 12/2013 | Mimura | H04W 40/00 370/328 |
| 2014/0059218 A1* | 2/2014 | Ganu | H04W 12/08 709/224 |
| 2014/0112305 A1 | 4/2014 | Dayanandan et al. | |
| 2014/0112311 A1 | 4/2014 | Dayanandan et al. | |
| 2014/0329522 A1 | 11/2014 | Dayanandan et al. | |
| 2015/0085844 A1* | 3/2015 | Tian | H04W 48/16 370/338 |
| 2015/0141015 A1* | 5/2015 | Zhang | H04W 36/0061 455/436 |
| 2015/0189561 A1 | 7/2015 | Dayanandan et al. | |
| 2015/0245268 A1* | 8/2015 | Williams | H04W 76/14 370/331 |
| 2015/0319407 A1 | 11/2015 | Frankel et al. | |
| 2016/0007278 A1 | 1/2016 | Gupta et al. | |

FOREIGN PATENT DOCUMENTS

| | | |
|---|---|---|
| GB | 2408173 A | 5/2005 |
| GB | 2500180 A | 9/2013 |
| KR | 20120044840 A | 5/2012 |
| WO | WO-2007104920 A1 | 9/2007 |
| WO | WO-2010/011732 A1 | 1/2010 |
| WO | WO-2014/145073 A1 | 9/2014 |

OTHER PUBLICATIONS

International Search Report PCT/ISA/210 for International Application No. PCT/EP2015/079673 dated Mar. 18, 2016.
International Preliminary Report on Patentability dated Jun. 13, 2017 issued in corresponding International Application No. PCT/EP2015/079673.
Intellectual Property Office Search Report for Application No. GB 1422183.2 dated Jan. 26, 2015.
Wan-Seon Lim et al., "PR-MAC: A Practical Approach for Exploiting Relay Transmissions in Multi-Rate WLANs", IEEE Transactions on Wireless Communications, IEEE Service Center, Piscataway, NJ, US, vol. 9, No. 1, Jan. 1, 2010, pp. 66-71.
Non-Final Office Action dated Oct. 24, 2018 in U.S. Appl. No. 14/747,438.
Final Office Action dated Apr. 19, 2017 in U.S. Appl. No. 14/747,438.
Non-Final Office Action dated Sep. 12, 2017 in U.S. Appl. No. 14/747,438.
Final Office Action dated Apr. 24, 2018 in U.S. Appl. No. 14/747,438.
Notice of Allowance dated Oct. 1, 2018 in U.S. Appl. No. 14/747,438.
Communication pursuant to Article 94(3) EPC dated Feb. 12, 2019 received from the European Patent Office for EP Application No. 15747389.3.

* cited by examiner

| Client MAC adrs | RSSI | | | | | | Steer Count |
| --- | --- | --- | --- | --- | --- | --- | --- |
| | me/5G | me/2.4G | A/5G | A/2.4G | B/5G | B/2.4G | |
| Client-1 | -67 | -62 | -88 | -84 | ND | ND | 1 |
| Client-2 | ND | ND | -68 | -64 | -76 | -72 | 0 |
| ... | ... | ... | ... | ... | ... | ... | ... |
| Client-N | | -40 | ND | ND | -86 | -79 | 4 |

FIGURE 7

CLIENT STEERING

CROSS-REFERENCE TO RELATED APPLICATIONS

This application is the U.S. National Phase application of PCT Application No. PCT/EP2015/079673 filed on Dec. 14, 2015, which claims priority to Great Britain Application No. 1422183.3 filed on Dec. 12, 2014, and is a Continuation-In-Part of PCT/EP2015/064163 filed Jun. 23, 2015 and also a Continuation-In-Part of U.S. patent application Ser. No. 14/747,438 filed Jun. 23, 2015, which claims benefit of U.S. Provisional Patent Application No. 62/015,853 filed Jun. 23, 2014 the entire contents of each of which are incorporated herein by reference.

FIELD OF THE INVENTION

This invention relates to the topology control and steering of client devices in wireless networks. In particular, but not exclusively, the invention relates to the topology control and steering of client devices in Wi-Fi networks.

BACKGROUND SUMMARY

It is known to provide wireless networks in which an infrastructure is provided to enable communication between electronic devices. A simple infrastructure is a basic service set (BSS), which comprises one Access Point (AP) and at least one client device. BSS's with the same service set identifier (SSID) form an extended service set (ESS). A client device typically associates with only one of the APs in the ESS to get access to a service, such as the Internet. It is worthwhile to note that a client device can be associated with only one AP at a time. For association, client devices usually select the AP that provides the highest signal strength in comparison to the signal strength provided by other APs in the same service set (SS). By doing so, a client device aims to maximize the quality of its direct wireless link with the access point (AP).

Most of the clients in a typical wireless network are mobile devices. These mobile devices, after associating with an AP, are likely to wander. For example, mobile devices may be moved by their user from one physical location to another physical location, and after having been moved they observe poor signal strength from the AP which they are associated with. If there is an AP (which is a member of the same ESS) in the vicinity of the client device, that can provide a better signal strength, then the client device would be well off associating with that AP. However, not every client device changes the AP it is associated with while wandering in the network. The term, 'sticky client' is used for such a client device that does not move to a better AP, even if its link quality with its current AP degrades significantly.

A sticky client may result in drastic performance degradation in the overall performance of a wireless network. This is because, when the link quality between the AP and the client device is poor, the AP and the client device need to use lower modulation and coding schemes (MCSs) for successful packet delivery, which takes a higher share from the airtime in comparison to transmissions in better quality links. Since the low quality links dominate the airtime usage, the overall network performance is mandated by the client devices that have poor links, yielding a significantly degraded overall network performance, such as in terms of throughput.

In order to address at least some of the above described issues, there is provided a wireless network device, for use within a wireless network, comprising: a processor; a memory; and an interface for receiving and transmitting data; wherein the wireless network device is adapted to: determine a first cost associated with communication between the wireless network device and a client device to which the wireless network device is connectable; determine a second cost associated with communication between the client device and a further wireless network device to which the client device is connectable; determine whether the first cost or the second cost is the lower cost; and if the second cost is the lower cost, the wireless network device is adapted to guide the client device to communicate with the further network device.

Further aspects of the invention will be apparent from the appended description and claims.

BRIEF DESCRIPTION OF THE DRAWINGS

FIG. 7 is a table of client information maintained by each access point according to an example.

DETAILED DESCRIPTION OF AN EMBODIMENT OF THE INVENTION

The goal of the steering method of the present invention is to identify client devices that encounter low link quality, and seamlessly steer them from one access point (AP) to another access point (AP), or to another interface on the same AP, whichever can provide better link quality.

Figure 1:
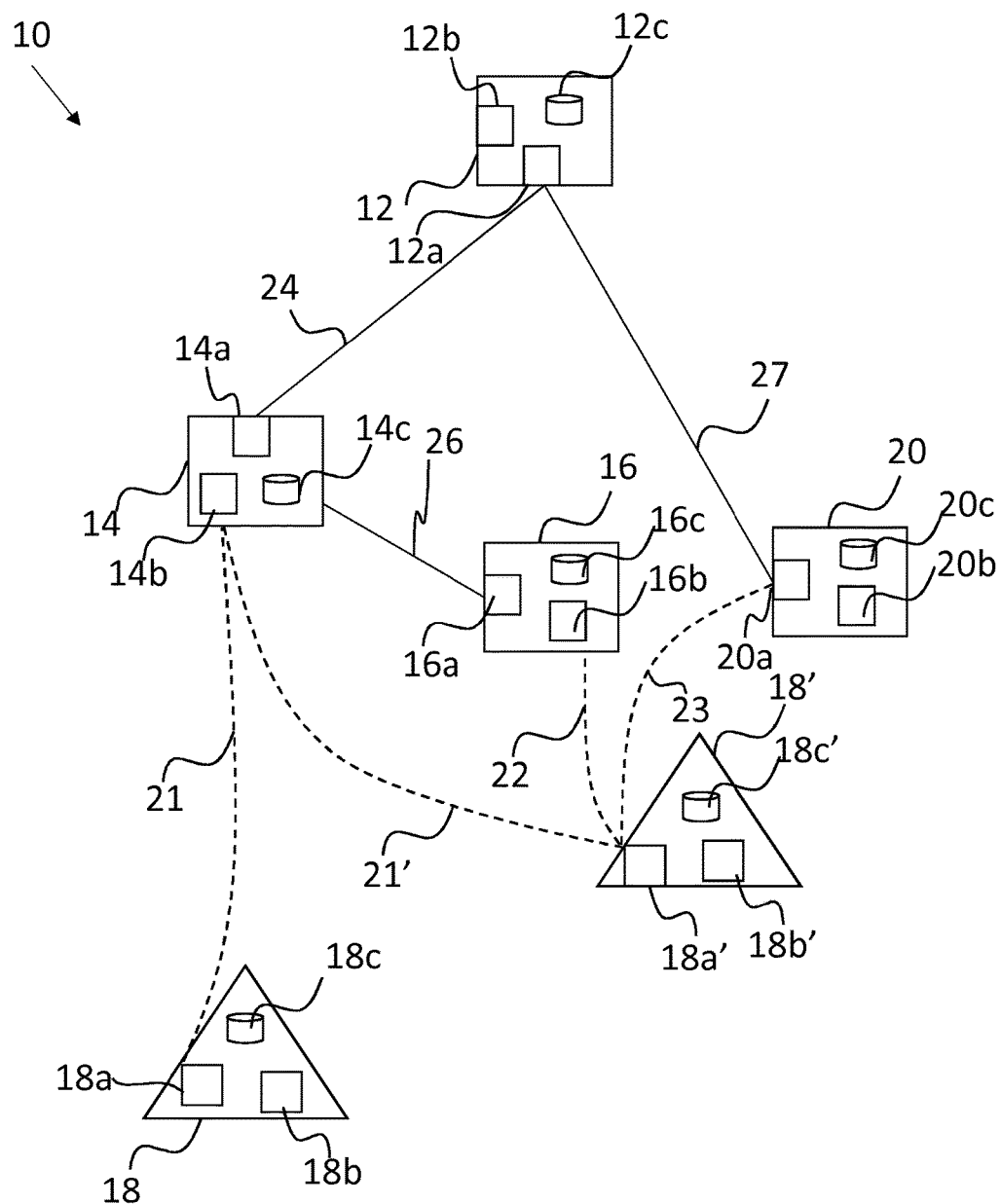
FIG. 1 is a schematic of a client device at two positions in a wireless network.

FIG. 1 shows a schematic of a client device 18 in a wireless network 10. The illustrated wireless network 10 comprises four access point (AP) devices—AP 12, AP 14, AP 16 and AP 20. Each of AP 14 and AP 20 is connected directly to AP 12, which in turn may be connected to a gateway (or which may be the gateway) that allows access to the internet, for example. Access point 16 is connected directly to access point 14. Access point 12 comprises an interface 12a for communication with other wireless devices, a processor 12b and a memory 12c. Access point 14 comprises an interface 14a for communication with other wireless devices, a processor 14b and a memory 14c. Access point 16 comprises an interface 16a for communication with other wireless devices, a processor 16b and a memory 16c. Access point 20 comprises an interface 20a for communication with other wireless devices, a processor 20b and a memory 20c. In further examples, a wireless network 10 may comprise any number of access points.

At FIG. 1, it is shown that AP 14 communicates with AP 12 over communication link 24 and AP 16 communicates with AP 14 over communication link 26. AP 20 connects directly with AP 12 over communication link 27.

Whilst there are four access points, AP 12, AP 14, AP 16 and AP 20 in the wireless network 10, in further examples there may be any number of access points. Further, whilst each of the access points AP 12, AP 14, AP 16 and AP 20 is shown to have an interface 12a, 14a, 16a and 20a respectively, in further examples each of the access points AP 12, AP 14, AP 16 and AP 20 may have any number of interfaces for communication with other devices. Further, whilst only one mobile client device 18 is shown in two positions, the mobile client device 18 may be free to move throughout the entire wireless network 10. Furthermore, there may be further client devices in the wireless network 10.

The wireless network 10 also has a client device 18, shown in a first position. The client device has an interface 18a for communication with other devices in the wireless network 10, a processor 18b and a memory 18c. Whilst there is shown only one interface 18a in the client device 18, in further examples the client device may have numerous interfaces for communicating with other devices in the wireless network 10.

The client device 18' is the same client device 18 that is shown in FIG. 1, however, the wireless network device 18' is the client device 18 shown at a second position in the wireless network 10. It may be envisaged that a user of the client device 18 starts use of the client device 18 at the first position of client device 18 in the wireless network 10 and subsequently moves to the second position of the client device 18' in the wireless network. In the event that the client device 18 moves from the first position to the second position, the relative communication abilities of the client device to communicate with the access points AP 12, AP 14, AP 16 and AP 20 may change. Therefore, the wireless network 10 can be adapted to monitor the changes of the signals within the wireless network 10 and adapt the behaviour of the wireless network 10 dynamically.

In the event that client device 18 at the first position initially communicates with access point AP 14 over communication link 21 between the interface 18a of the client device 18 and the interface 14a of the access point AP 14, and a user moves to the second position, the client device 18' at the second position may continue to use communication link 21' to communicate between the interface 18a' of the client device 18' at the second position and the interface 14a of the access point 14. It may, however, be that the communication link 22 between the interface 18a' of the client device 18' at the second position and the interface 16a of access point AP 16 may provide a superior communication link. In this case, the client device 18, 18' is operating in the manner of a sticky client that degrades the overall performance of the network. In order to address this issue, the sticky client device 18, 18' is either steered to another interface 14a on its current AP 14, or it is steered to an AP/interface with better link quality, such as the interface 16a of access point 16. The client device 18' at the second position could communicate with the interface 20a of AP 20 over communication link 23, if it is preferential to steer the client device 18' to communicate with AP 20 via interface 20a. The mechanism for enabling this steering is described below, with respect to FIGS. 2 to 7, whereby the mobile client device 18 is assessed with respect to its signal strength to all APs, AP 12, AP 14, AP 16 and AP 20 in the network, and client device 18 is steered to the best AP. For example, in the situation of FIG. 1, when the client device 18 is moved from the first position to the second position, the client device 18' at the second position may be in the vicinity (e.g., able to communicate with both) of two access points, AP 16 and AP 20. In line with the methods described below, the information collected by the access points AP 12, AP 14, AP 16 and AP 20 will be used to determine the best communication path for the client device 18' and steer the client device 18' to connect with the best access point. For example, if it is determined that the effect of path cost of communication between the client device 18' and the access point AP 12 (where AP 12 acts as the gateway for the wireless network 10), is greater when communicating via AP 14 that is connected to AP 16 (over communication links 26 and 24), compared communicating with AP 20 that is directly connected with AP 12 via communications link 27, the access point AP 14 can steer the client device 18' to connect with AP 20 rather than AP 16. Conversely, if the cost of connecting with AP 12 via AP 14 and AP 16 is less than connecting with AP 12 via AP 20, client device 18' may be steered to connect with AP 16, even if the cost of connecting with AP 20 is less than the cost of connecting with AP 16. The access points AP 12, AP 16, AP 20 can communicate with one another to send and receive data from one another in order to enable such steering. This is described in more detail with reference to FIGS. 2 to 7

In the example of FIG. 1, each device in the wireless network is shown to have only one interface for interfacing with other devices in the wireless network 10. However, in further examples, the devices (AP 12, AP 14, AP 16, AP 20 and client device 18, 18') may have further interfaces to communicate with other devices in the wireless network 10. Therefore, rather than being steered to communication with a different access point, a client device may be steered for communication with a different interface of the same access point. For example, a dual-band client device 18, 18' that has both very good signal strength in 2.4 GHz and 5 GHz bands, may be steered to communicate over the 5 GHz interface if it is currently associated with the 2.4 GHz interface; or a client device 18, 18' may be steered to a better AP/interface when such an AP/interface is found (without the need for the client device 18, 18' to have very bad signal quality with its current AP/interface).

The extended service set (ESS) may or may not comprise APs 12, 14, 16, 20 with or without dual-band capabilities (i.e. at interface 12a, 14a, 16a, 20a); and the client device 18, 18' may or may not employ dual-band radios (i.e. at interface 18a, 18a'). However, it may be advantageous when an ESS comprises APs and client devices have dual-band concurrent radios.

Figure 2:
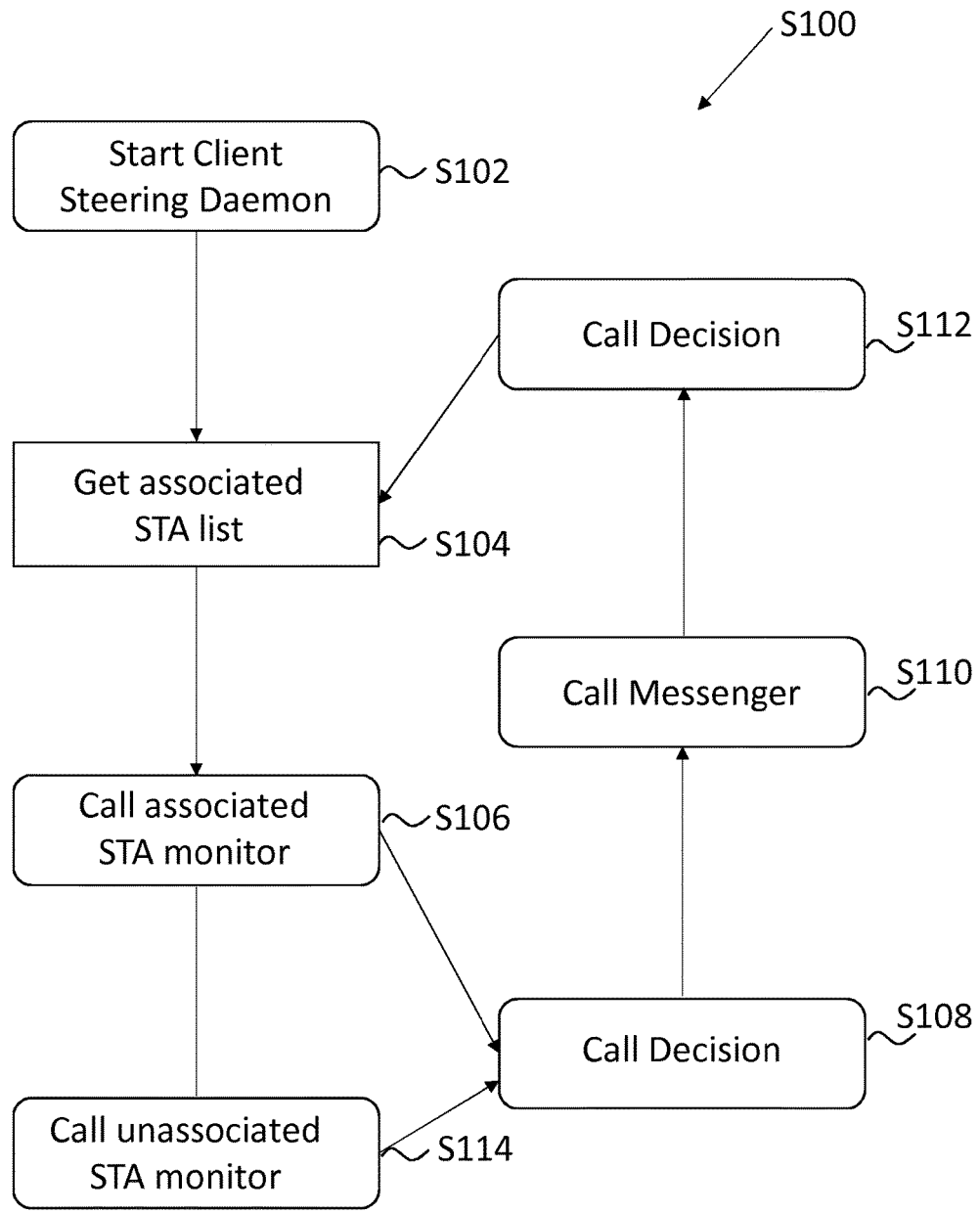
FIG. 2 is a flow chart of a client steering daemon.

The apparatus described with reference to FIG. 1 may be configured to perform an embodiment of the invention, as described with reference to FIG. 2. FIG. 2 is a flowchart of a process S100 showing operation of the client steering function according to an embodiment of the invention. The process S100 is performed periodically in order that access points can retrieve fresh data and adapt dynamically to a changing wireless network 10.

The process begins at step S102, where the client steering daemon is initiated by the access point 14. The client steering daemon is initiated at the access point 14, but in further examples can be initiated by any of the access points AP 12, AP 14, AP 16, AP 20, described with reference to FIG. 1, or by any further access points not shown in FIG. 1, but present in network 10.

Once the client steering daemon has been initiated at step S102, the process moves to step S104. At step S104, the access point 14 determines the associated STA list. The associated STA list is a list of client devices 18 that are associated with the access point that is running the client steering daemon. In the example of FIG. 1, there is only one client device 18, however, in further examples there may be more client devices.

Once the access point 14 has determined the associated STA list, the process moves to step S106 and step S108, which may be operated independently of one another. At step S106, the access point 14 determines data for each of the associated client devices 18. The details of how this data is obtained is described in greater detail with reference to FIG. 3, below.

The access point 14 also calls for data from other access points 12, 16, 20 in the wireless network 10, in order that it can determine data for unassociated client devices, at step S114. This is described in greater detail with reference to FIG. 4, below. In further examples, the access point 14 can call for data from other access points present in the wireless network 10, but not shown at FIG. 1.

For each associated client device 18 of the access point AP 14 that is performing the method, a decision is made at step S108, as to whether to keep the client 18, guide the client 18 to another AP/interface 12, 16, 20 or whether to steer the client 18 via a IEEE 802.11v transition request message or a deauthenticate message. These decisions are detailed below with reference to FIG. 5.

Once the decision has been made in respect of each associated device 18 at step S108, the process moves to step S110, whereby, following the decision made in respect of each client device at step S108, the implementation of the decision is made by calling the messenger protocol at step S110. The messenger protocol is detailed at FIG. 6. Following announcements made in respect of step S110, the decision mechanism of FIG. 5 is applied again at step S112. The process then moves to step S104, where the process repeats, dynamically to update the associated STA list of associated client devices, with updated data, as well as get updated data from unassociated client devices at step S114.

For each of the associated client devices 18 of an access point 14 in a wireless network 10, data is gathered, as shown at step S106 of FIG. 2. The process for obtaining the data, upon which the decisions of step S108 of FIG. 2 are made, is shown at FIG. 3.

Whilst the method of FIG. 2 is described in relation to access point 14, any access point in the wireless network 10 may be configured to perform the client steering daemon of FIG. 2.

Figure 3:
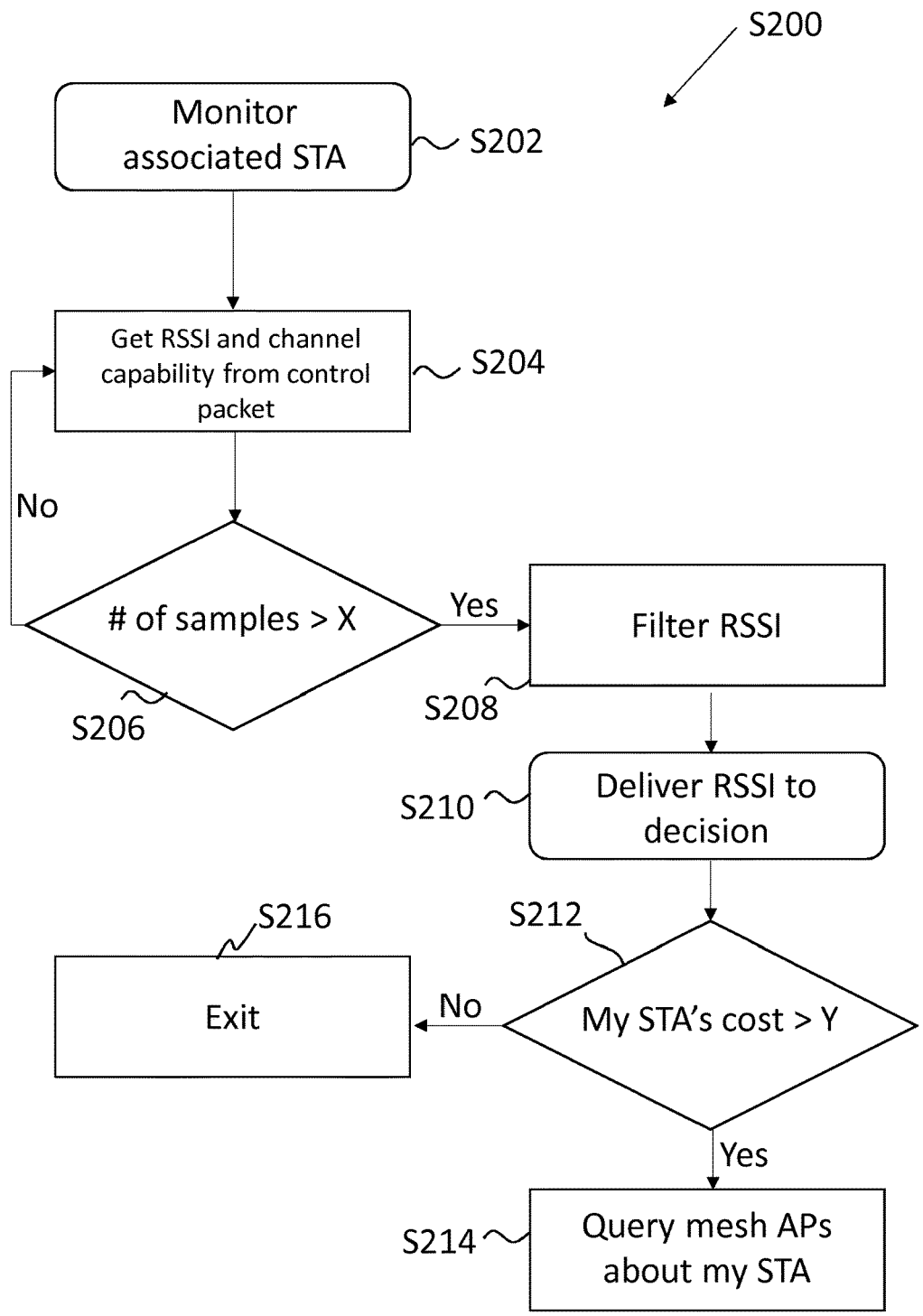
FIG. 3 is a flow chart for an associated client device.

In order to gather information from client devices 18 that are associated with an access point 14, the process of FIG. 3 is implemented at an access point 14. FIG. 3 is a flowchart showing a process S200 of monitoring associated client devices 18. The process S200 is initiated at an access point, such as access point 14, at step S202. The process moves to step S204, where the access point (e.g. access point 14 of FIG. 2) gathers information from associated client devices, e.g. client device 18 of FIG. 1. At step S204, received signal strength indicator (RSSI) and channel capabilities are determined from information received from the associated client devices. Whilst only one client device 18 is shown at FIG. 1, in further examples there may be more client devices that can be monitored by the access points, such as by access point 14.

The steering process described with reference to FIG. 2 makes use of the signal strength quality information between a client device 18 and the APs 12, 14, 16, 20 in the network 10. Signal strength information is gathered in terms of received signal strength indicator (RSSI). The RSSI between a client 18 and the AP 14 that the client 18 is associated with is obtained via physical layer driver of the AP 14. The RSSI between a client 18 and an AP 12, 16, 20 which the client 18 is not associated with is obtained through management, control and data packets sent by the client 18.

The APs or the clients in the network 10 may or may not have dual-band capability. An AP 12, 14, 16, 20 that employs the steering mechanism of FIG. 1 may learn about the dual-band capability of APs 12, 14, 16, 20 and clients 18 through information messages sent by APs 12, 14, 16, 20 and probe requests sent by clients 18, respectively. In an example, unless a probe request is received on a band, that band is not assumed to be available on that client device 18. Once a probe request message is received on a band, say the 2.4 GHz band, that client device 18 is marked as being 2.4 GHz band capable. This information may be distributed among the APs throughout the use of a client information table 70 which is shown at FIG. 7. The band capability information of a client may be unlearned if the client device is disassociated with the network 10 for at least a predetermined duration of time, which, in an example, may be set as several days. This information can be stored in non-volatile memory; thus they can be available even after rebooting the device. Information about the client can be unlearnt (by erasing the information from the volatile memory) within predetermined intervals if the client has not been seen in the network for a predetermined duration, which may set as 1 week.

The access point 14 uses control and management packets (frames) sent by the client device 18 to:
(1) identify which interfaces are available on the client device 18,
(2) acquire the signal strength of the client device 18 observed by other APs 12, 16, 20 in the network.

Each AP 12, 14, 16, 20 maintains a table that stores the signal strength information with respect to each client, and periodically shares this table with other APs 12, 14, 16, 20 in the same BSS via broadcasted information messages. A sample client information table maintained by an AP that employs the steering mechanism of FIG. 1 is depicted in FIG. 7.

FIG. 7 shows an exemplary client information table 70. There is a list of client devices 72a, 72b to 72c, with MAC addresses. For each of the client devices 72a, 72b, 72c, there is corresponding RSSI information 74 stored in columns. In the example of FIG. 7, each client device 72a, 72b to 72c has corresponding RSSI data for each of two interfaces (the 2 GHz band and the 5 GHz band) of the devices 72a, 72b to 72c.

The "me" columns 74a, 74b of the table of FIG. 7 represents the signal strength observed by the AP which maintains this table 70. If a client device 18 is associated with this AP 14, then the signal strength information is acquired by the access point 14 through its own measurements; however if the client 18 is not associated with this AP 14, then the signal strength information is acquired through management, control and data packets sent by the client device 18. Moreover, the information in the other columns, i.e., the columns which represent the signal strength observations of the other APs 12, 16, 20 in the network 10, are obtained through the periodic information announcements of the other APs 12, 16, 20 in the network 10. If there is no information about the signal strength of the client device 18, then the respective entry is noted as "ND" meaning that there is "No Data". ND may occur when a client device does not send packets, or its packets are not received by APs. "Steer Count" column 74g indicates how many times that specific client device has been steered within the last ten minutes in the network. This information is kept in an effort to penalize frequent steering of a client device. The table 70 of FIG. 7 shows data for each of two interfaces of two access points (access point A of columns 74c and 74d and access point B of columns 74e and 74f), however, in further examples, the number of access points is dependent on the number of access points in the wireless network 10.

The AP 14 may carry out the step of S204 periodically. For example, every 1 second the AP 14 gets the following information about each of its associated client devices 18: signal strength, idle time (which corresponds to the duration for which the AP 14 has not received any data packets from the client device 18).

Once the AP 14 has obtained information at step S204, the process S200 moves to step S206, where it is asked whether the number of samples that the AP has received from the client devices 18 that it is monitoring is larger than a predetermined number, X, for each of the client devices 18 that it is monitoring. If the AP 14 has received a sufficient number of samples, the process moves to step S208. If the AP 14 has not received a sufficient number of samples, i.e. the number of samples received from each client device 18 is not greater than X, the process returns to step S204, and further information is received from the client devices 18 with which the AP 14 is associated. The number X is configurable based on the requirements of the access points, client devices and network.

Therefore, the AP 14 uses sliding window averaging on the signal strength (RSSI) observed by itself and obtained through announcement messages, (and uses this averaged value for decisions) such that AP 14 computes the mean (arithmetic average) RSSI between itself and the client device 18 considering, for example, the latest 20 seconds of information, which also corresponds to the last 20 RSSI samples. Since the AP 14 always has RSSI information of the client devices 18 that are connected to itself, averaging could always be carried out over 20 samples. In further examples, different averaging processes could be used, for example, based on different sample sizes and different sample time windows.

At step S208 the RSSI data from the client devices 18 to which the AP 14 is connected, is filtered, so that historic data is not used to make current decisions. The AP 14 keeps the RSSI information gathered in the last 20 seconds. Thus, RSSI information older than 20 seconds is not kept and not taken into account in any case. Therefore the RSSI data is filtered at step S208. In further examples, the RSSI information can be kept for any predetermined time in order, according to the information required in order to decide to which AP a client device should connect.

The process S200 then moves to step S210, where the AP 14 delivers the information that it has collected, regarding the client devices 18 to which it is connected, to the decision-making part of the process of the method described at FIG. 2. The decision making part of the process can be performed by the access point 14 itself.

The process S200 then moves to step S212, where it is asked whether the cost of keeping the client device 18 associated with it is greater than a predetermined value, Y. A client device 18 is assumed to be well-off associated with its current AP 14, unless the minimum cost that would be obtained by associating the client 18 with another AP/interface 12, 16, 20 is greater than the current cost by some margin defined by the cost function.

There are 3 methods for cost computation which are described here (though other cost computations might be envisaged in further examples):

(1) A single-hop cost computation.
(2) A path-aware computation. The path-aware computation is further implemented in two different mechanisms depending on how the best path is calculated. Specifically,
 (a) best path to the GW is calculated based on the best AP-to-AP costs that are calculated by an steering daemon, such as that described in relation to FIG. 2.
 (b) best path to the GW is calculated based on the best AP-to-AP costs that are directly retrieved from a mesh routing table.

The single-hop cost computation makes use of only the STA-to-AP average RSSI (i.e. client device to access point average RSSI). However, the path-aware methods compute the STA-to-GW (i.e. client device to gateway) end-to-end physical rate by making use of the following:

(1) access point (AP) to gateway (GW) shortest path in terms of physical rate,
(2) client device to access point (STA-to-AP) physical rate, which is converted from client device to access point (STA-to-AP) RSSI.

Single-Hop Information Based Cost Computation

In this method, the cost of a link is computed with respect to the following policy:

(1) A client device is assumed to be well-off associated with its current AP, unless the minimum cost that would be obtained by associating the client device with another AP/interface is greater than the current cost by some margin defined by the cost function.

(2) Each interface, for example the 2.4 GHz and 5 GHz interfaces, has its own cost function, where the cost monotonically decreases except for break point—with respect to the signal strength.

Here, the cost function is assumed to be a partial linear function of signal strength, i.e., y=ax+b. Here, a defines how quickly the cost is decreased as signal strength is increased, and b represents a bias on the cost for incorporating preference among different alternative costs.

The cost for all interfaces as well as the cost of the same interface for different signal level ranges are assumed to have different slopes, in an effort to differentiate changes in the cost with respect to different signal levels.

In an example, let $\rho$ represent the signal strength. $C_5(\rho)$ and $C_2(\rho)$ define costs for a candidate AP (i.e. an access point other than the client device's associated AP), for the 5 GHz band and the 2 GHz band, respectively, when the signal strength observed by the other AP/interface is $\rho$.

$C_{5b}(\rho)$ and $C_{2b}(\rho)$ define costs for the AP to which STA is currently associated, for 5 GHz band and 2 GHz band, respectively, when the signal strength observed by the associated AP/interface is $\rho$. Thus, with respect to the above policy, the cost functions are defined as follows:

$$C_5(\rho) = \begin{cases} a_{5,1}\rho + b_{5,1} & \text{if } \rho \geq \Gamma \text{ dBm} \\ a_{5,1}\rho + b_{5,1} & \text{if } \rho < \Gamma \text{ dBm} \\ 0 & \text{if } AP \text{ is } GW-DHCP \text{ and } \rho > \Gamma_{GWh} \text{ dBm} \end{cases}$$

$$C_5b(\rho) = \begin{cases} a_{5b,1}\rho + b_{5b,1} & \text{if } \rho \geq \Gamma \text{ dBm} \\ a_{5b,1}\rho + b_{5b,1} & \text{if } \rho < \Gamma \text{ dBm} \\ 0 & \text{if } AP \text{ is } GW-DHCP \text{ and } \rho > \Gamma_{GWl} \text{ dBm} \end{cases}$$

$$C_2(\rho) = \begin{cases} a_{2,1}\rho + b_{2,1} & \text{if } \rho \geq \Gamma \text{ dBm} \\ a_{2,2}\rho + b_{2,2} & \text{if } \rho < \Gamma \text{ dBm} \end{cases}$$

$$C_{2b}(\rho) = \begin{cases} a_{2b,1}\rho + b_{2b,1} & \text{if } \rho \geq \Gamma \text{ dBm} \\ a_{2b,2}\rho + b_{2b,2} & \text{if } \rho < \Gamma \text{ dBm} \end{cases}$$

Where GW-DHCP means that the access point is the root gateway access point of the network. The aim of the process of FIG. 1 is to keep client devices associated with the AP/interface that provides the minimum cost among all alternatives.

Multi-Hop Path Cost Based Steering

Each access point 12, 14, 16, 20 knows which access point is directly connected to the gateway. The AP that has direct gateway connection is the root AP. Each AP has a MAC address of the root AP, which it obtains through the steer-daemon's messaging protocols, described in further detail below. In the example of FIG. 1, access point AP 12 is the root AP.

Knowing this, each AP periodically obtains the cost of getting from itself to the root AP, which can be done by making use of a routing table. The cost obtained from the routing table represents AP-to-root-AP cost. This cost is distributed among APs, thus each AP has the knowledge of every AP's cost to root-AP.

In an example, the client device to AP cost (STA-to-AP cost) is computed by making use of the metric:

$$C_{sa} = \left[\frac{X}{[R_{sa}/Y] + 1}\right]$$

where $R_{sa}$ represents the physical rate between the client device (STA) and the access point (AP), and s is the client device, and a is the AP. Note that C_sa is inversely proportional to the rate. [.] is a floor operator, and by dividing R_sa by Y and taking the floor of the output, R_sa is being quantized in multiples of Y. The use of X, together with floor operator, [.], is to make the C_sa an integer number so that the computation and storage is optimized for the processor. In an example, for 802.11ac capable Wi-Fi devices, X is preferable greater than 10,000. In an example, Y may be as low as 1, where no quantization is required, and in a preferable embodiment Y is selected as 20 for better differentiation between consecutive rates.

The client device to root AP (STA-to-root-AP) cost, $C_{sr}$, is computed as follows:
1. for client devices (STA) at 5 GHz: $C_{sr} = C_{sa} + C_{ar}$,
2. for client devices (STA) at 2.4 GHz: $C_{sr} = \max(C_{sa}, C_{ar})$, $R_{sa}$ is obtained through RSSI to phy rate conversion table. In further examples, different metrics may be used.

Multi-Hop Path Cost Computation Based on Mesh Link Costs

To determine the path-aware cost computation using information gathered by steering-daemon described in relation to FIG. 2, each AP periodically gathers and updates its RSSI with its neighboring APs, and disseminates this information to the other APs in the network. Thus, each AP has RSSI information of each wireless AP-to-AP link in the network. Having obtained link RSSI, each AP can compute the respective link phy rates through a RSSI to phy rate conversion table.

The end-to-end rate between an AP, a, and the root-AP, r, is calculated as:

$$R_{sa} = \left(\frac{1}{R_{a1}} + \frac{1}{R_{a1}} + \ldots + \frac{1}{R_{nr}}\right)^{-1}$$

Where 1 . . . n are the intermediate APs. Each AP runs Dijkstra Algorithm to find the shortest (fastest) path, from every AP to the root AP.

Then, the client device to root AP (STA to root-AP) path cost is computed as $C_{sr} = R_{sr}^{-1}$ Where (1) for the client device (STA) at 5 GHz: $R_{sr} = (1/R_{sa} + 1/R_{ar})^{-1}$, and (2) for the client device (STA) at 2.4 GHz: $R_{sr} = \min(R_{sa}, R_{ar})$ Whilst three methods for calculating costs of links between an access point and a client device are described here, other methods of calculating costs between an access point and client device could potentially be used to determine the cost and the value at which it is better for a client device to associate with a particular access point instead of another particular access point.

Figure 4:
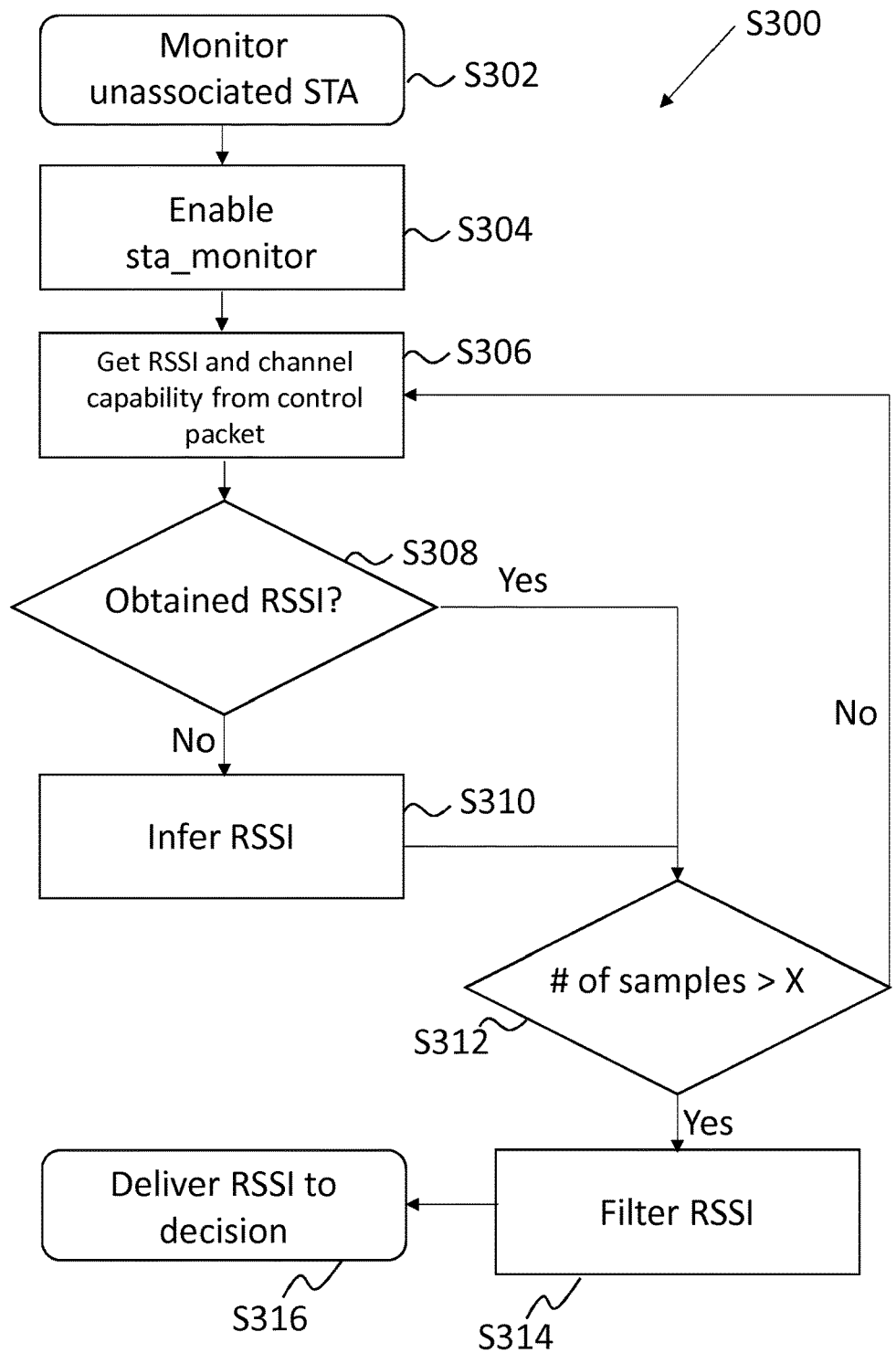
FIG. 4 is a flow chart for an unassociated client device.

As described above in relation to FIG. 2, the access point 14 can gather data in relation to other client devices with which it is not associated. A process for gathering such data is shown at FIG. 4. FIG. 4 is a flowchart showing a process S300 of monitoring unassociated client devices.

The process commences at step S302 where the AP 14 initiates the process of monitoring client devices that are not associated with it by obtaining information from other access points 12, 16, 20 to which it is connected in a network (for example, a wireless mesh network). The process moves to step S304, where the protocol to monitor clients to which the AP 14 is not connected. Step S304 may be initiated periodically, for example, every 1 s, AP enables sta monitor for a duration of 50 ms for client devices connected to other APs (or other interface of the same AP). By doing this, the AP 14 accepts packets that are not destined to itself, and thus, the AP 14 gets to measure the RSSI of packets which are not destined to be sent to itself.

In an example, every 1 s, the AP 14 gets the following information about each of its direct mesh peers (e.g. access points 12, 16, 20): signal strength, physical (phy) rate of the last transmitted packet, physical (phy) rate of the last received packet.

Further, in the example, every 1 s, the AP 14 checks if it has received any packets from the client devices that belong to the same SSID. If it has received packets from client devices that belong to the same SSID, it stores this RSSI info together with its timestamp (designating the actual time this RSSI was obtained).

Once the information has been gathered at step S306, the process moves to step S308, where it is determined if the RSSI values have been obtained by the process at S306. If the RSSI values have not been obtained, the process moves to step S310, wherein the RSSI values might be inferred.

For example, an AP may facilitate RSSI inference between the 2.4 GHz band and the 5 GHz band. Specifically, when a client device is connected to an AP on its 2.4 GHz interface, AP can get up-to-date RSSI info about the client device on 2.4 GHz, whereas 5 GHz info is infrequent and unpredictable (since this info is obtained through mainly probe request messages). In such a case, the AP can infer the client device's RSSI on 5 GHz, if the client device is marked as 5 GHz capable. In particular, if the client device is learned to be dual-band capable, then:

(1) if the client device is connected on the 2.4 GHz interface, and the associated AP does not have valid RSSI info on the 5 GHz band (due to not receiving any packet from this client device on this interface), then it infers the 5 GHz band RSSI by subtracting a predetermined but configurable value from the 2.4 GHz band RSSI. This is learnt by monitoring the client device's transmissions in the 2.4 GHz and 5 GHz bands. For example, if the RSSI at the 2.4 GHz band is −60 dBm, and the RSSI at the 5 GHz band is measured to be −75 dBm, then this value is set as −75−(−60)=−15 dBm. If there is no learnt value, then a default value is used. In an example the learnt value is unlearnt after 60 s. The predetermined default value is set in an example to −8.0 dB. For example, if the 2.4 GHz RSSI is −50 dBm, then 5 GHz RSSI is inferred as −58 dBm.

(2) In an example, inferring the 5 GHz band RSSI from 2.4 GHz RSSI may be enabled only if the 2.4 GHz band RSSI is above a predetermined but configurable threshold, which is set in an example to −66 dBm.

(3) if the client device is connected on the 5 GHz interface, and the associated AP does not have valid RSSI info on the 2.4 GHz band (for example, due to not receiving any packet from this client device on this interface), then it infers the 2.4 GHz band RSSI by adding a predetermined but configurable value to the 5 GHz. This predetermined value is set in an example to 0.0 dB. For example, if the 5 GHz band RSSI is −70 dBm, and the value is 3 dB, then 2.4 GHz RSSI is inferred as −67 dBm.

(4) Inferring the 2.4 GHz band RSSI from the 5 GHz band RSSI may be enabled only if the 2.4 GHz band RSSI is below a predetermined but configurable threshold, which is set, in an example, to −100 dB.

If the actual RSSI values were determined at step S308 to have been obtained at step S306, or if the RSSI values have been inferred at step S310, the process moves to step S312, where it is determined by the access point 14 whether the number of samples that the AP 14 has received from the client devices that are being monitored by other access points 12, 16 to which the AP 14 is connected is larger than a predetermined number, X, for each of the client devices that it is being monitored by an access point to which it is connected. If the AP 14 has received a sufficient number of samples, the process moves to step S314. If the AP 14 has not received a sufficient number of samples, i.e. the number of samples received from each client device is not greater than X, the process returns to step S306, and further information is received from other access points 12, 16, 20, to which the access point 14 is connected. The value of X can be configured to provide a preferred number of samples.

The AP 14 computes the mean RSSI between another AP 12, 16, 20 and the client device, considering the latest samples obtained within the last 20 seconds. Since RSSI info gathered from other APs 12, 16 is not frequent and is unpredictable (because it depends on activity on the client device), the number of RSSI samples gathered within the last 20 s may vary. For that reason, a minimum number of RSSI samples are needed to carry out averaging. These minimum numbers can be determined, in an example, based on the RSSI between the associated AP and the client device, as follows:

(1) If the RSSI between the client device and its associated AP is higher than −70 dBm, then at least 3 samples are needed in the last 20 s, to carry out averaging.

(2) If the RSSI between the client device and its associated AP is lower than −70 dBm but higher than −77 dBm, then at least 2 samples are needed in the last 20 s, to carry out averaging.

(3) If the RSSI between the client device and its associated AP is lower than −77 dBm, then 1 sample in the last 20 s is sufficient, to carry out averaging. If the above criteria are not met, and thus, an average RSSI cannot be calculated, then RSSI is regarded as invalid to be used in decision state. In further examples, other schemes for computing RSSI values might be used.

Once a sufficient number of samples has been obtained at step S312, the process moves to step S314. At step S314 the RSSI data from the client devices to which other AP devices 12, 16 are connected, is filtered, so that historic data is not used to make current decisions. The AP 14 keeps the RSSI information gathered in the last 20 seconds. Thus, RSSI information older than 20 seconds is not kept and not taken into account in any case. Therefore the RSSI data is filtered at step S314.

Once current data has been collected, the process S300 moves to step S316, where the collected data is provided to the appropriate decision making AP, so that it might determine how client devices should be connected.

Whilst the process of FIG. 4 has been described above in relation to the devices of FIG. 1, as with all the processes described here, there may be any number of access points and client devices operating in a wireless network, which access points can employ the processes in order to guide client devices.

Figure 5:
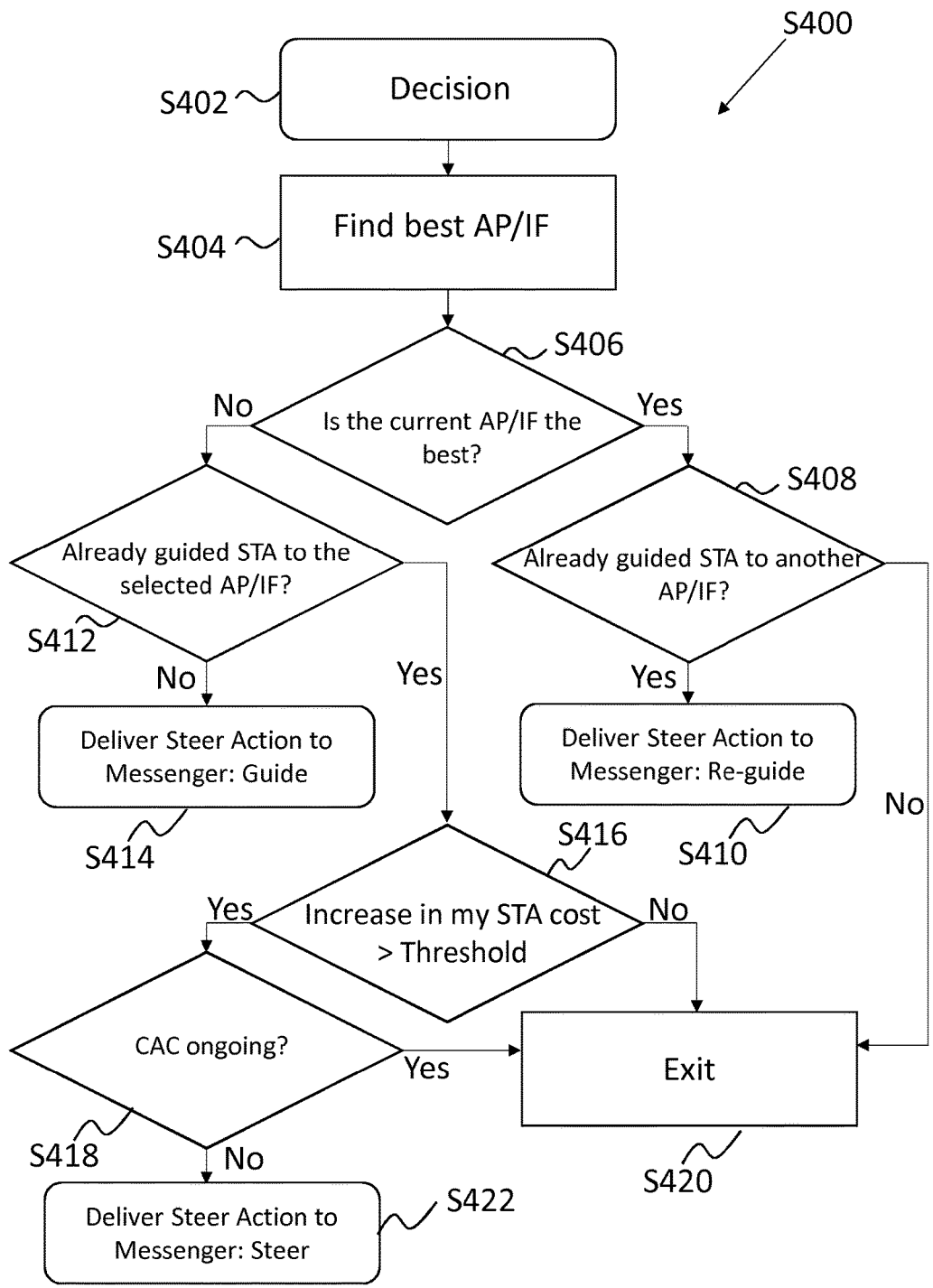
FIG. 5 is a flow chart of a steering mechanism.

An access point, such as AP 12, 14, 16, 20 can be configured to run a protocol to decide on how to handle associations between client devices an access points. The process for performing the decision mechanism is shown at FIG. 5. FIG. 5 is a flowchart showing the decision mechanism for dealing with associated client devices.

Once data relating to the communication pathways between the AP 14, client device 18 and other access points 12, 16, 20 in a wireless network 10 has been established, the AP 14 is in a position to determine the optimum communication pathways for client devices in the network.

The process S400 is initiated by an access point, such as AP 14, at step S402. The process moves to step S404, where the best access point and/or interface is determined for each client device for which a decision is being made.

The best access point and/or interface to which a client device might connect is based on the signal strength information stored 74 in the table 70 of FIG. 7. Each AP that has associated client devices calculate cost of keeping each of its client device, and compare this cost to the case where each of its client devices is associated with the AP/interface which observes the best signal strength. If the AP finds out that its client device would be better-off, i.e., its cost is lower, if it was associated with another AP/interface, then the AP steers this client device to the other AP. Methods of calculating the cost are given above.

In an example, the SSID is same for the same interface of all APs (that is to say, the 5 GHz band SSID is the same for all the APs, and the 2.4 GHz band SSID is the same for all the APs), the same security protocol and the same security key is used for all the AP/interfaces, Once the best access point and/or interface has been determined, the process S400 moves to step S406. At step S406 it is determined if the current access point (e.g. AP 14) and/or interface to which a client device (e.g. client device 18) is connected is the best access point and/or interface, as computed at step S404. If the current access point and/or interface is the best access point and/or interface, the process moves to step S408. If the current access point and/or interface is not the best access point and/or interface, the process moves to step S412. At step S412, it is determined whether the client device has already been guided to the best access point and/or interface. If it has not, the process moves to step S414, where the action to guide the client device to the best access point and/or interface is processed by the messenger protocol.

If at Step S412 it is determined that the client device has already been guided to the best access point and/or interface determined at step S404, the process moves to step S416, where it is determined if the increase in the cost of keeping the client device with the access point and or/interface to which it is connected is greater than a predetermined threshold.

If the answer is no, the process moves to step S420 and exits the process S400. If the answer is yes, the process moves to step S418, where it is determined if CACs are ongoing. If the answer is yes, the process moves to step S420 and exits the process flow S400. If the answer is no, the process moves to step S422, where the action to steer the client device to the best access point and/or interface is sent to the messenger.

If it was determined at step S406 that the present access point and/or interface to which the client device is connected is the access point and/or interface that is the best one, as calculated at step S404, then the process moves to step S408, where it is determined if the client device has already been guided to another access point and/or interface.

If the answer at step S408 is yes, then the action to re-guide the client device to the best access point and/or interface as calculated at step S404, is made to the messenger. If the answer is no, the process flow S400 moves to step S420 and the process flow S400 is exited.

The decision process, as described at S400, may be run periodically. For example, every 1.5 seconds, the AP goes into a decision state in which, for each client device:

(1) The AP calculates the (end-to-end) cost of the client device if it is connected to itself, and the cost if the client device is connected to another possible AP/interfaces in the network, (2) based on the calculated cost, the AP gives a decision on whether to:

(i) keep the client device(s)
  (ii) guide the client device(s) to other AP/interfaces (explicitly specifying which AP/interfaces to accept association requests from this client device).
  (iii) steer the client device(s) (deauthenticate the client device—explicitly specifying which AP/interfaces to accept association requests from this client device).

Each AP/interface periodically, for example, every 1.5 seconds, goes into the decision state in which it decides whether to steer its client device(s) to other AP/interfaces based on the calculated costs or not. The decisions are explained here:

Keep the client decision is given if no other APs/interfaces provide a lower cost than the current AP/interface's cost. If the decision is "keep the client", then the AP does not take action on this AP, i.e., keeps announcing this client device as a STA connected to itself.

Guide the client decision is given if the AP/interface with the minimum cost is not the current AP/interface, and if there have been less than, for example, 12 guide announcements for this client device (by this AP) in the last 20 s. If the decision is "guide the client", then the AP carries out the following in the below order:

(1) broadcasts an announcement (guide) message indicating which AP/interface to accept this client device, (2) if the client device is guided to another AP, then the steering AP blacklists the client device in all its interfaces for a duration of 9 s (blacklist timeout), (3) if the client device is guided to other band of the guiding AP, i.e., band steering on the same AP, then the guiding AP blacklists the client device on the current interface.

In an example, only 1 in 3 guide decisions are actually broadcasted. Specifically, the first guide decision is broadcasted, the second and the third are not broadcasted, the fourth is broadcasted, and so on (if the target AP/interface is the same for all guide decisions). That is to say, the first guide decision is broadcasted, the second and the third are skipped, and the fourth is broadcasted, etc. Note that with this setting, only 1 guide message is broadcasted every 4.5 s. In the case of a decision change during the course of guiding, such as guiding the STA to another AP/interface, the guiding process is reset.

In an example, if there are multiple client devices (STAs) to be guided from the same AP, then the decisions on these STAs can be announced within the same guide message. Thus, neither the number nor frequency of guide messages are increased with the increased number of guided STAs from the same AP.

A guide announcement is valid, i.e., the destination AP/interface removes and does not add the guided client to its blacklist, until guide timeout duration is completed. The destination AP/interface removes the client device from its blacklist as it receives the guide message, and it does not reinsert this client device to the blacklist, until:

1. another guide message is received for this client device, but this time destination AP/interface is not itself (AP tries to guide the client device to another AP/interface), or Specifically, 2. guide timeout is reached.

The guide timeout in an example, is set, in an example, to 30 s for client devices not in a list referred to as the 'touchablelist', and it is set to 90 s for the client devices in the 'touchablelist'.

Guiding messages may make use of the IEEE 802.11v standard, in the event that the client devices operate within the standard Steer the client decision is given if the AP/interface with the minimum cost is not the current AP/interface, and if there have been a number, for example 12, guide announcements for this client device by this AP to the same target AP in the last 20 s, for example, and at least 240 s has passed since the last time this client device has been deauthenticated by any AP in the network. If the decision is "steer the client", then the AP carries out the following in the below order:

(1) broadcast an announcement (steer) message indicating which AP/interface to accept this client, (2) if the client device is steered to another AP, then the steering AP (i) blacklists the client device in all its interfaces,
  (ii) hides its SSID in the beacons sent from all its interfaces,
  (iii) if the client device is steered to other band of the steering AP, i.e., band steering on the same AP, then the steering AP blacklists the client device on the current interface and hides its SSID in the beacons sent from the interface from which the client device is steered from, for a duration of, for example, 9 s (blacklist timeout) and 9 s (ssid hide timeout), respectively.
  (iv) wait for 0.5 s, for example, and then send a deauthenticate packet with reason code 8 to the client device.

A decision, as described in reference to FIG. 5, may be calculated at one access point and then the information sent in a message to one or more of the other access points in a network, such that the best association of client device to access point might be achieved. Preferably, each access point may calculate a decision and share that information with other access points in the wireless network.

Figure 6:
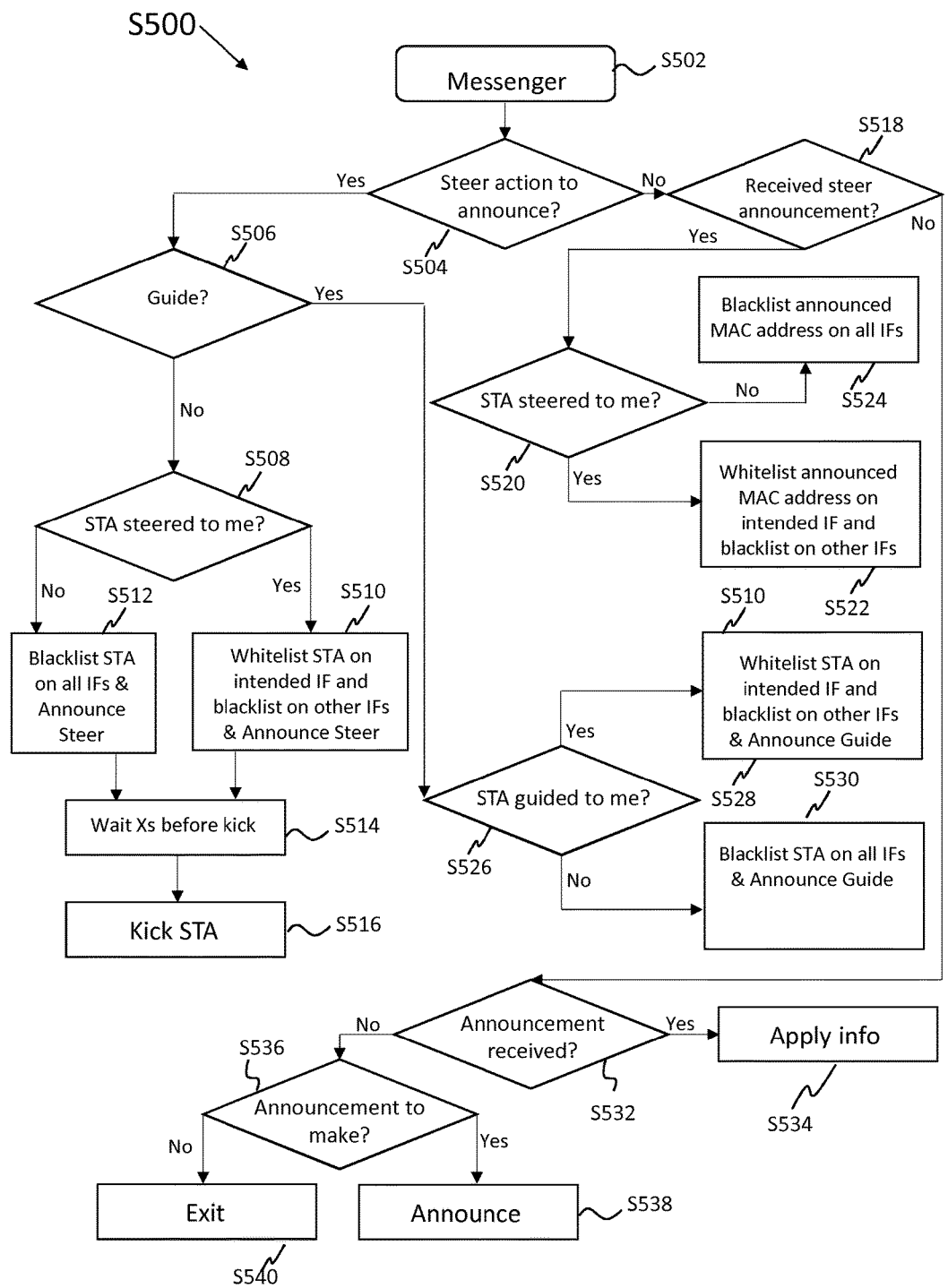
FIG. 6 is a flow chart of steering instructions.

Once a decision has been made as to the best course of action for each client device, the information is processed by the messenger mechanism, which may be implemented at the same access point, for example AP 14, or a different access point. FIG. 6 is a flowchart showing the messenger mechanism for guiding client devices in the wireless network 10.

In addition to deciding what should happen to each of the client devices to which an access point it connected, a messenger, as described at step S110 of FIG. 2, is used to disseminate the findings of the decision process of FIG. 5. The process begins at step S502, where the messenger protocol is initiated. The process S500 then moves to step S504, where it is determined if there is a steer action to announce by the access point. If the answer is yes, the process moves to step S506. If the answer is no, the process moves to step S518.

At step S506 it is determined whether the client device is to be guided. The outcome of this question is either yes, whereby the process moves to step S526, or no, whereby the process moves to step S508. At step S508 it is determined whether the client device is to be steered to the access point. If the answer is no, the process moves to step S512 and the client device is blacklisted on all interfaces of the access point and a steer message is announced. If the answer is yes, the process moves to step S510 and the client device is added to a whitelist on the intended interface of the access point and the client device is added to a blacklist on all of the other interfaces. A steer message is then announced. The process then moves from either S512 or S510 to step S514, whereby a predetermined amount of time is waited before kicking the client device at step S516 (deauthenticating the client device).

Guide and steer announcement messages preferably have unique sequence numbers. The announcement messages are preferably broadcast through Ethernet and wireless mesh interfaces. The steering messages preferably use unique EtherType, which is preferably set as "0x7379".

If at step S506 it is determined that the client device is to be guided, the process moves to step S526 where it is determined at the access point if the client device is to be guided to the access point. If the answer is yes, the process moves to step S528, whereby the client device is added to a whitelist for the intended interface of the access point and a blacklist for the other interfaces of the access point. If the answer is no, the process moves to step S530, whereby the client device is added to the blacklist for all interfaces of the access point.

If it was determined at step S504 that there is no steer decision to announce, the process moves to step S518, where it is determined if a steer announcement that has been received from other access points to which the access point is linked via the network. If the answer is yes, the process moves to step S520, where it is asked if there is a client device that should be steered to the access point. If the answer at step S520 is no, the process moves to step S524 and a blacklist is announced of MAC addresses on all interfaces of the access point. If the answer is determined to be yes at step S520, the process moves to step S522 where a whitelist is announces of MAC addresses on the intended (i.e. best) interface of the access point and on a blacklist for the other interfaces of the access point.

In an example, client devices with a MAC addresses matching the Organizationally Unique Identifier (OUI, first 3 bytes of the MAC address) specified in a list known as 'untouchablelist' are exempt from all client device steering operations. That is to say, these listed client devices are never blacklisted nor steered.

For the client devices with a MAC addresses matching the OUI specified in a list known as 'touchablelist' are subject to a different blacklist timeout duration than the other client devices have. For example, whereas the normal blacklist timeout may be 9 s, the blacklist timeout for the client devices in the touchablelist may be 90 s.

Preferably, when an AP receives a steering announcement, then the AP carries out the following in the below order:
(1) if it is the destination, then the AP
  (i) removes the client device in the intended interface's blacklist. Note that before receiving the steering announcement, the client device is in the blacklist of both interfaces of the destination AP. The destination AP keeps the client device in the blacklist of its other interface, i.e., not the intended interface.
  (ii) hides its SSID in the beacons sent from its other interface (not the intended interface).
2. if it is not the destination, then
  (i) the AP blacklists the client device in all its interfaces, i.e., continues to keep this client device in all its interfaces' blacklists.
  (ii) the AP hides its SSID in the beacons sent from all its interfaces.

If no steer announcement has been received at step S518, then the process moves to step S5312, where it is determined if an announcement has been received. If it has, the process moves to step S534 and the information is applied.

When an announcement message is received, the AP updates the Client Information Table (such as the table 70 shown at FIG. 7) with respect to the information in the announcement message. In particular, the following data about a client device can be either updated or created (if there is no previous data):
  (i) RSSI of the client device: the AP keeps the RSSI information gathered in the last 20 seconds, for example. Thus, RSSI information older than 20 seconds is not kept and not taken into account.
  (ii) Idle time of the client device: Idle time is measured with respect to the AP which the client device is connected to. Thus, this information is included only in the announcement messages that are sent by the client device's associated AP.
  (iii) RSSI of other mesh APs: the AP keeps the info about the RSSI between each AP in the network (only in the 5 GHz band).

If no announcement has been received at step S532, the process moves to step S536, where it is determined if there is an announcement to make. If there is an announcement to make, the process S500 moves to step S538 and the announcement is made by the access point. If there is no announcement to make, the process moves to step S540 and the process S500 is exited.

Whilst different implementations of the general concept are envisaged, the following provides preferable implementations of the methods described herein.

In an example, every 3 s, the access point AP sends an announcement message that contains:
  (i) the signal strength of the client devices that are associated to it.
  (ii) the idle time for the client devices that are currently associated to it.
  (iii) the signal strength of the client devices that are overheard by it, through monitoring of client devices (sta monitor), through broadcast messages sent by the client devices, such as probe requests.
  (iv) Signal strength of the mesh APs (peers) this AP is directly connected to (only in the 5 GHz band).

As described above, the access point utilizes a blacklist mechanism to reject client devices' association requests. Each interface of the access point has a separate blacklist, which can be enabled and disabled independently. The definition and usage of a blacklist is as follows:

(1) If a client device is in the blacklist of an interface, then AP does not respond to probe, authentication, association and re-association requests sent by this client device on that interface.

(2) If a client device is not in the blacklist of an interface, then AP responds to probe, authentication, association and re-association requests sent by this client device on that interface.

(3) When a client device is added to the blacklist, a timer, which is set to 9 s, for example, starts. This duration is called 'blacklist timeout'. If the AP does not get any announcement messages regarding this client device during this duration, then the AP removes the client device from the blacklist when the timer expires. Every time the AP gets announcement message regarding this client device during this duration, then the AP removes the client device from the blacklist when the timer expires. Every time the AP gets an announcement message regarding this client device from its associated AP, it resets the timer (to its initial value, e.g., 9 s).

Periodically, for example every 1 s, the access point evaluates which clients to keep in its blacklists and which client devices to remove from its blacklist. This mechanism differs from the decision mechanism, in that, whereas an AP can give a decision only on a client device that is connect to it, the AP can keep or remove a client device from its blacklist even if the client device is not connected to it.

Specifically, in an example, 1. if the average signal strength info, i.e., the RSSI observed by the AP which the client device is currently associated to (obtained by every AP in the network through the announcement messages) is less then −79 dBm, then all the APs remove the client device from both the 2.4 GHz and the 5 GHz interfaces' blacklists, 2. if the idle time info of a client device (obtained by every AP in the network through the announcement messages) is above 50 seconds, then
  (i) if the client device is single-band, then the AP removes that client device from its 2.4 GHz and 5 GHz interfaces' blacklists.
  (ii) if the client device is dual-band, then the AP removes that client device from its 5 GHz interfaces' blacklists.

3. if the client device's idle duration announced by its associated AP is longer than the duration observed by the AP, then the AP removes the client device from the blacklist(s) of the interface(s) which the client device is observed at. In particular, the AP compares the last time it has heard from the client device, say t0, with the last time, say t1, AP which the client device is currently associated to heard from the client device. Note that t0 and t1 represent timestamps, i.e., actual times. Let di denotes the idle duration reported in the announcement message, and tb represents the current actual time, i.e., the actual time when the AP is in the blacklist evaluation cycle. Then, t1=tb−di. The AP removes the client device from its respective interface's blacklist, when di>5 s and t0−t1>4 s.

4. if the client device is not designated as associated to any AP, then the AP removes the client device from all its blacklists. The AP learns about connection status of the client device through announcement messages. If a client device is not announced by any AP as connected, then the APs remove that client device from their blacklists immediately.

Preferably the AP shall learn about the band capability of client devices. Specifically:

(1) the AP learns about the band capability of a client device by observing its transmissions on both bands. For example, when a client device is observed to send a packet on the 5 GHz band, then the client device is marked as 5 GHz capable; likewise, when a client device is observed to send a packet on 2.4 GHz band, then the client device is marked as 2.4 GHz capable. Consequently, if a client device is observed on both bands, then the client device is marked dual-band capable.

(2) the AP also learns about the band capability of messages.

(3) the AP unlearns the band capability, when the AP changes its operating channel. The AP needs to relearn the band capability of the client device for the new channel.

The use of messages within a network of wireless network devices, such as access points, enables the access points within the wireless network to know which client devices to put into blacklists, and which client devices to remove from blacklists. Furthermore, the use of messages may facilitate the dissemination of information relating to costs of links, such as RSSI data, or computed costs. Furthermore, the use of guide messages between access points in a wireless network facilitates the network in steering client devices.

Preferably, all information learned about client devices, such as band-capability, steer-count, etc., can be stored in non-volatile memory, thus this information is not lost after reboot. However, this information is erased from the memory if it is not refreshed for a predetermined amount of time, such as 1 week. Note also that this information can be retrieved by announcement messages of other APs which still have information on that client device.

The AP shall preferably unlearn (reset) all information about a client device, when the duration since the client device's last association to any AP in the network exceeds a predetermined but configurable value, and the AP has not been reboot during this period. This predetermined duration is set as 2 days, in an example.

Preferably, each AP keeps track of the number of deauthentications a client device has encountered. This information is stored in the Client Information Table 70 of FIG. 7 under the column 74g Steer Count. Each AP increments the steer count when it deauthenticates a client device, and disseminates this information together with its periodic announcement messages. Hence, all APs in the network know how many times a client device has been deauthenticated in the network.

Regarding single-hop cost based steering, preferably, client devices' connection to the GW-AP (the AP that is directly connected to the gateway (GW)) is favored in the 5 GHz band. (This function is called GW-AP differentiation, aka GW-bias.) That is to say, preferably, in an example:

1. If the client device is already connected to the GW-AP (in 5 GHz) with a signal level above $\Gamma_{GWl}$ currently set to −77 dBm, then its current cost is set to "0". Thus it is not steered to another AP in any case.

2. If the client device is not already connected to the GW-AP (in the 5 GHz band), and its signal level with respect to the GW-AP is above $\Gamma_{GWh}$, currently set to −63 dBm, then its cost with GW-AP is set to "0" and the client device is steered to GW-AP.

3. For the signal levels other than stated above, costs are computed without differentiating the GW-AP. GW-AP differentiation is not applied for the 2 GHz band of the GW-AP.

Preferably, client devices can be steered among the AP/interfaces which have the same SSID, the same security protocol, and the same security key (open security can be used as well, but in that case all APs shall employ open security).

Preferably, for client device steering to perform in accordance with its design, the client devices shall have only the SSID of the client device steering enabled network in their active Wi-Fi network profiles. If there is another active Wi-Fi network in the client device's profile, then the client device itself can roam to the other network, thus eradicating client device steering's control on the client device.

When process flow described at FIG. 2 is terminated (killed or stopped), the blacklist mechanism is disabled; thus the APs respond to probe and authentication requests automatically without consideration.

Events and Corresponding Actions

The following is a list of events and exemplary corresponding actions that form a preferable implementation of the method of FIG. 2:

Receive Probe Request:

In response to receiving a probe request at an AP, from a client device, if the client device is on the blacklist, then the AP ignores a request from that client device, i.e., do not respond to the request. In response to receiving a probe request at an AP, from a client device, if the client device is not on the blacklist, then the AP responds to the request by sending Probe Response. In response to receiving a probe request at an AP, from a client device, if the client device is associated to any AP in the mesh network, then: add RSSI obtained from this packet to the RSSI history corresponding to this client device; get band/channel capability information.

Receive Authentication Request:

In response to receiving an authentication request from a client device at an AP, if the client device is on the blacklist, then ignore the request, i.e., do not respond to the request. In response to receiving an authentication request from a client device at an AP, if the client device is not on the blacklist, then the AP always responds to authentication requests.

Receive Disassociation from Client Device

Remove the client device from the list of associated client devices in response to receiving a disassociation message from a client device. Announce disassociation of the client device to other mesh-APs in response to receiving a disassociation message from a client. Remove the client device from the blacklist and the whitelist in response to receiving a disassociation message from a client device.

Receive Disassociation Announcement from Mesh-AP

Remove the client device from the blacklist and the whitelist in response to receiving a disassociation announcement from a mesh AP.

Receive Guide Announcement:

In response to receiving a guide announcement from another AP at the AP, if the AP/IF receiving the guide announcement is the destination AP/IF, then remove the client device from the blacklist of the respective interface, and blacklist the client device in other interfaces. In response to receiving a guide announcement from another AP at the AP, if this AP/IF is not the destination, then blacklist the client device in all interfaces. In response to receiving a guide announcement from another AP at the AP, start blacklist timer.

Receive Steer Announcement:

In response to receiving a steer announcement at an AP, if this AP/IF is the destination, then remove the client device from the blacklist of the respective interface, and blacklist the client device in other interfaces. In response to receiving a steer announcement at an AP, if this AP/IF is not the destination, then blacklist the client device in all interfaces. In response to receiving a steer announcement at an AP, start blacklist timer.

Client Associated:

If a client device is associated with an AP and if there is no entry already created for this client device, create an entry for this client device. If a client device is associated with an AP, do not put the client device in the blacklist of the associated interface, but blacklist of other interfaces. If a client device is associated with an AP, announce association to mesh-APs.

Client Association Announcement Received:

In response to receiving a client association announcement at an AP, if there is no entry already created for this client device, create an entry for this client device. In response to receiving a client association announcement at an AP, blacklist the client device on all interfaces.

Channel Availability Check (CAC) is in Progress:

When a CAC is in progress, do not send any announcement messages in the 5 GHz band. When a CAC is in progress, cancel steering actions in the 5 GHz band, i.e., do not deauthenticate any clients in the 5 GHz band. When a CAC is in progress, do not steer any client devices from the 2.4 GHz band to the 5 GHz band.

Mesh Configuration Share is in Progress:

When mesh configuration sharing of information is in progress, halt all steering functions until the end of Mesh Configuration Share process.

SSID is Changed:

In response to a change of SSID, announce new SSID to other mesh APs in broadcast. Note that client devices are steered among AP/interfaces that have the same SSID.

AP that has Direct Gateway Connection is Changed:

In response to an AP that has a direct Gateway changing, the AP that has direct Gateway connection announces its connection to other mesh APs in broadcast.

Mesh Link is Down

In the event that a mesh link is not functioning, an AP can announce the broken link, i.e., MAC addresses of the owners of the broken link. In the event that a mesh link is not functioning, the owners of the broken link identify and announce if there occurs an isolated AP (isolated from the Gateway) due to the broken link. The isolated AP makes the announcement. If there is an isolated AP, then all other APs remove the client devices associated to that isolated AP from their blacklists. That is to say, client devices connected to the newly isolated AP are free to move to other APs.

Advantageously, the invention described herein enables control of the topology of a network and client devices to be steered within a wireless network, enabling the client devices to be steered to the best access points for maintaining data transfer rates throughout the network, as well as providing the client devices with the best available connection. Beneficially, the system continuously monitors client connections and updates information at interconnected access points in the network, thereby dynamically addressing any changes and deficiencies.

Further, the client devices do not need to receive explicit instructions themselves, rather the access points can be used to steer the clients. However, the access points can also be adapted to directly deal with client devices that support standard steering instructions, such as IEEE 802.11v, IEEE 802.11k and IEEE 802.11r.

Whilst the wireless network 10 described above comprises wireless devices, the invention can also be implemented in mesh networks with hybrid communication links (such as Ethernet, PLC, Bluetooth, etc.). Indeed, the access points in a network may be connected over wired connections, such as Ethernet, and interact with wireless client devices within a wireless network.

The invention claimed is:

1. A wireless network device, for use within a wireless mesh network, comprising:
   a memory;
   an interface for receiving and transmitting data; and
   a processor configured to,
      determine a first cost associated with communication between the wireless network device and a client device to which the wireless network device is connectable,
      determine a second cost associated with communication between the client device and a further wireless network device to which the client device is connectable,
      determine whether the first cost or the second cost is the lower cost, and
      guide the client device to communicate with the further wireless network device, if the second cost is the lower cost, wherein
      the first cost is an end-to-end cost metric based on a measured physical data rate between the wireless network device and a gateway to which the wireless network device is connectable,
      the second cost is an end-to-end cost metric based on a measured physical data rate between the gateway and the further wireless network device to which the client device is connectable, and
      the wireless network device is configured to receive data, via the interface, from other wireless network devices in the wireless mesh network, the data being indicative of the second cost.

2. The wireless network device according to claim 1, wherein the wireless network device is adapted to guide the client device to communicate with the further wireless network device by broadcasting or unicasting instructions via the interface to the client device or other wireless network devices within the wireless mesh network.

3. The wireless network device according to claim 2, wherein the instructions comprise a message indicating which wireless network device in the wireless mesh network or which interface is to connect with the client device.

4. The wireless network device according to claim 3, wherein the message is a IEEE 802.11v message.

5. The wireless network device according to claim 1, wherein, if the second cost is the lower cost, the wireless network device de-authenticates the client device, thereby to guide the client device.

6. The wireless network device according to claim 1, wherein the wireless network device maintains a blacklist of client devices in the memory, wherein the blacklist comprises a set of predetermined actions of the client devices on the blacklist that are not responded to by the wireless network device, preferably wherein the blacklist of client devices comprises a list of client devices for which the second cost is the lower cost, and more preferably wherein the set of predetermined actions includes any of probe requests, authentication requests and re-association requests.

7. The wireless network device according to claim 6, wherein the blacklist is updated each time the wireless network device determines that a client device to which the wireless network device is connectable has a second cost that is the lower cost, preferably wherein the blacklist is updated to remove the client device to which the wireless network device is connectable after a predetermined time, and more preferably wherein the blacklist is updated to remove the client device to which the wireless network device is connectable when it is determined by the wireless network device that the first cost is the lower cost.

8. The wireless network device according to claim 1, wherein a Service Set Identifier (SSID) of the wireless network device is hidden in all beacon signals transmitted by the wireless network device if the second cost is the lower cost.

9. The wireless network device according to claim 8, wherein the Service Set Identifier (SSID) of the wireless network device is subsequently not hidden in all beacon signals transmitted by the wireless network device when the wireless network device determines that the first cost is the lower cost.

10. The wireless network device according to claim 1, wherein the wireless network device comprises a further wireless network interface that is independently operable from the interface.

11. The wireless network device according to claim 1, wherein the wireless network device maintains data relating to a number of times the second cost is determined to be the lower cost.

12. The wireless network device according to claim 1, wherein the wireless network device is adapted to receive a message from another wireless network device in the wireless network device, preferably wherein the message is a guide message or a steer message.

13. The wireless network device according to claim 1, wherein the first cost is based on a signal strength between the wireless network device and the client device.

14. The wireless network device according to claim 1, wherein the second cost is based on a signal strength between the client device and the further wireless network device.

15. The wireless network device according to claim 1, wherein the wireless network device is adapted to maintain a list of misbehaving client devices in the memory, wherein client devices on the list of misbehaving client devices are not deauthenticated.

16. The wireless network device according to claim 1, wherein the wireless network device is adapted to gather information from other network devices in the wireless mesh network, wherein the information comprises channel capabilities and/or bandwidth information and/or protocol information and/or antenna capabilities.

17. A wireless mesh network comprising:
   a plurality of wireless network devices each including,
      a memory;
      an interface for receiving and transmitting data; and
      a processor, the processor of at least one wireless network device of the wireless network devices being configured to,
         determine a first cost associated with communication between the at least one wireless network device and a client device to which the at least one wireless network device is connectable,
         determine a second cost associated with communication between the client device and a further wireless network device to which the client device is connectable,
         determine whether the first cost or the second cost is the lower cost, and
         guide the client device to communicate with the further wireless network device, if the second cost is the lower cost, wherein
            the first cost is an end-to-end cost metric based on a measured physical data rate between the wireless network device and a gateway to which the wireless network device is connectable, the second cost is an end-to-end cost metric based on a measured physical data rate between the gateway and the further wireless network device to which the client device is connectable, and the at least one of the wireless network devices is configured to receive data, via the interface, from other wireless network devices in the wireless mesh network, the data being indicative of the second cost.

18. A method of operating a wireless network device, for use within a wireless mesh network, the method comprising:

determining a first cost associated with communication between the wireless network device and a client device to which the wireless network device is connectable;

determining a second cost associated with communication between the client device and a further wireless network device to which the client device is connectable;

determining whether the first cost or the second cost is the lower cost; and guiding the client device to communicate with the further wireless network device, if the second cost is the lower cost, wherein the first cost is an end-to-end cost metric based on a measured physical data rate between the wireless network device and a gateway to which the wireless network device is connectable, the second cost is an end-to-end cost metric based on a measured physical data rate between the gateway and the further wireless network device to which the client device is connectable, and the wireless network device is configured to receive data, via an interface, from other wireless network devices in the wireless mesh network, the data being indicative of the second cost.

* * * * *